United States Patent [19]

Westemeier

[11] Patent Number: 4,568,090
[45] Date of Patent: Feb. 4, 1986

[54] OIL SEAL FOR LUBRICATED TRACKS ON A CRAWLER TRACTOR

[75] Inventor: Donald E. Westemeier, Dubuque, Iowa

[73] Assignee: Deere & Company, Moline, Ill.

[21] Appl. No.: 663,722

[22] Filed: Oct. 22, 1984

[51] Int. Cl.⁴ .............................................. F16J 15/34
[52] U.S. Cl. ........................................ 277/84; 277/92; 305/11
[58] Field of Search ...................... 305/11; 277/84, 92, 277/95

[56] References Cited

U.S. PATENT DOCUMENTS

| | | | |
|---|---|---|---|
| 4,132,418 | 1/1979 | Roli | 277/84 |
| 4,262,914 | 4/1981 | Roley | 305/11 |
| 4,295,654 | 10/1981 | Kawamura et al. | 277/92 |
| 4,331,339 | 5/1982 | Reinsma | 277/84 |
| 4,344,629 | 8/1982 | Oelke | 277/95 |
| 4,364,572 | 12/1982 | Yamamoto et al. | 277/92 |
| 4,426,091 | 1/1984 | Baylor | 277/84 |
| 4,504,066 | 3/1985 | Hörl | 277/84 |

Primary Examiner—Robert I. Smith

[57] ABSTRACT

A track link assembly in which an outer link end has an annular recess opening towards an inner link end and which further has a track bushing on the connecting pin or link extending through the inner link and fixed thereto. The bushing has an end facing the recess with an annular groove in that end. A comparatively hard seal ring is positioned in the recess and has an annular end portion conforming in shape and seated in the annular groove and extending radially and inwardly from that end to an opposite end that has a pair of annular lips, one of which engages a radial wall surface of the recess and the other of which engages the surface of the pin. The hard seal ring is provided with a comparatively resilient load ring that maintains seating between the lips and their respective surfaces and the one end of the hard seal ring and the annular groove.

10 Claims, 2 Drawing Figures

OIL SEAL FOR LUBRICATED TRACKS ON A CRAWLER TRACTOR

BACKGROUND OF THE INVENTION

This invention relates to a seal for a lubricated track on a track-laying vehicle. More particularly, this invention relates to a two-piece seal arrangement, one piece of which serves to engage the surfaces of a track link assembly so as to seal lubricant in the assembly and prevent the introduction of dirt and other foreign matter to the lubricant areas of the assembly.

In a conventional type of track linkage, there are provided inner and outer link portions that are connected at a common end and through which a pin extends. The outer link portion normally has an annular recess facing the inner link portion. A track bushing extends through and is connected to the inner link portion and normally has its end closing the recess of the outer link. The track bushing oscillates with the inner link portion and relative to the pin which is fixed to the outer link portion. Lubricant is fed through the center of the pin and suitable orifices extend to the area between the pin and the bushing for providing lubricant between those surfaces. The seal assembly fits in the recess and seals the recess against leakage of the lubricant and also prevents dirt and other foreign matter from entering into the areas of lubrication.

In the normal design of the seal assembly, there is provided a main seal ring that has a lip which engages the end of the track bushing and serves to seal that end against lubricant leakage. The main seal ring is held in its correct position by a load ring that fits next to the seal ring and walls of the recess and in effect, holds the lip in its proper position. In this arrangement, the track bushing oscillates with respect to the lip on the seal assembly.

The problem with the conventional-type seal is that often, the lip will become worn or will cut an annular groove in the end of the track bushing which eventually permits leakage of the lubricant or passage of the foreign materials into the lubricated areas.

SUMMARY OF THE INVENTION

With the above in mind, it is the primary object qf the present invention to provide a seal assembly that has two annular lips thereon, one of which engages the surface of the recess formed in the outer link and a second lip of which bears against the surface of the pin. With such an arrangement, lubricant may move under one lip but will very seldom move under the second lip. Likewise, dirt and other foreign matter that might move under one lip might have difficulty moving under the second lip. In such an arrangement, the seal member is fixed to the track bushing. This is done by providing a groove in the end of the track bushing and to provide complimentary surfaces in the seal ring of the seal assembly that sits in the bushing groove. Opposite to the portion of the seal ring that fits in the groove, the seal ring has two lips, one of which engages the wall surface of the recess and the other of which engages the surface of the pin. The interior of the ring is generally hollow and there is provided a load ring that fits or is inserted in the hollow portion of the seal ring and resists distortion and movement of the respective lips away from their seated position against their respective surfaces. The load ring also forces the portion of the seal ring that sits in the groove of the track bushing to retain its seated position.

DESCRIPTION OF THE PREFERRED EMBODIMENT

Figure 1:
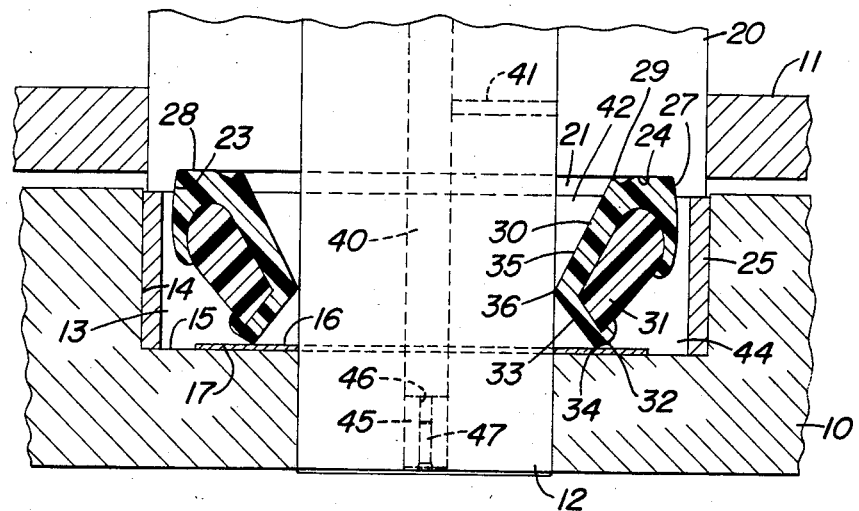
FIG. 1 is a sectional view of a seal assembly taken at one end of a track and which incorporates the features of the present invention.

Referring now to FIG. 1, the seal assembly shown therein is one which can normally be used in a conventional type track link assembly used on crawler-type tractors. A conventional type link for a track-laying implement has one end offset axially with respect to an opposite end. When assembled, the outermost end of one link is positioned on the pin next to the innermost end of the adjoining link. Referring to FIG. 1, the outer link end is shown at 10 and the inner link end is shown at 11. The links having the ends 10, 11 extend in opposite directions from and are pivotally connected at the adjoining link ends 10, 11 by a track pin 12 which extends through both ends 10, 11. The outer link end 10 has an annular recess 13 next to and concentric with the pin 12. The recess 13 opens toward the inner link end 11 and is made of an axially extending annular wall 14, a radial wall 15 and in part, by a washer 16 having a radial wall 17 against which the seal, as will later become apparent, rests. The wall or surface 17 is hardened so as to resist wear.

A track bushing 20 is mounted on the pin 12 and extends through, and is tightly gripped by, the inner link end 11 so as to oscillate with the link end 11. The track bushing 20 has an annular groove 21 at its end which is at the entry side of the recess 13. The groove 21 is made up of a radially extending wall 24 and an axially extending wall 23. The wall 23 forms an annular shoulder with the radial wall 24 at the base of the groove 21.

A non-corrosive thrust ring 25, extending substantially the full depth of the recess 13, is placed inwardly of the axial wall 14 of the recess 13 and contacts the track bushing 20 outwardly of the axial wall 23. The thrust ring 25 generally limits axial movement of the track bushing 20, as well as the pin 12. Also, the flat surfaces between the edge of the thrust ring 25 and the edge of the track bushing 20 serve partly as a seal which prevents free flow of material into the area inward of the thrust ring 25.

Positioned in the recess 13 and annular groove 21 is a seal assembly composed of a main annular seal member 30 and an annular load seal member 31. The primary seal member 30 is made of a relatively rigid abrasion-resistant material such as polyurethane, for example, while the seal member 31 is composed of a resilient, relatively pliant material, such as rubber. The primary seal member 30 has a C-shaped interior which tends to grip or hold the secondary seal member 31. The primary seal member 30 has at one end a flat radial face 28 and a flat outer surface 27 that bears against and conforms to the surfaces 23, 24 of the groove 21. Consequently, the shoulder formed by the walls 23 and 24 serves to limit or prevent radial and axial shifting of the primary seal member 30. The primary seal member 30 also has an annular lip 29 radially inwardly of the surface 28 with a sharp annular edge in contact with the surface 24 of the groove 21. At the opposite end of the primary seal member, there is provided a pair of diverging walls 32, 33 that form an annular lip 34 that bears against the surface 17 of the wear or thrust washer 16. The diverging wall 33 extends towards the pin 12 where it meets a second diverging wall 35 to form a lip 36. The lip 36 bears against the hardened outer surface of the pin 12. The two annular lips 34, 36 are held in engagement with the wall 17 and the surface of the pin 12 through the action of the forces in the load or secondary seal member 31. The member is composed of a more resilient type of material and is compressed in the interior of the C-shaped member 30 and tends to expand the annular seal member 30 so as to hold the lips 34, 36 in their proper position. Since the wall 31 is outboard of the lips 34, 36, the forces are directed such as to force the lips in contact with pin 12 and surface 17. The pin 12 has a hollow interior 40 that serves as a lubricant or oil reservoir. Oil passages 41 extend from the reservoir 40 to the area between the pin 12 and the track bushing 20. As pressure is applied to the lubricant, it moves axially along the surface of the pin 12 into a reservoir area 42 between the surface 35 of the primary seal 30 and the surface of pin 12 and the end of the track bushing 20. As mentioned previously, the end of the track bushing 20 bears against the end of the thrust ring 25 and generally seals off the area of the seal from material outside of the links. If some does enter into the seal area, it will be trapped between the open side of the C-shaped opening of the primary seal 30, the annular ring seal 31, the inner surface of the ring 25, and the radial wall portions 15 and 17 outboard of the annular lip 34. The two radial lips 34, 36 will generally prevent the foreign matter from entering into the lubricant reservoir 42 and will likewise prevent leakage of oil in the lubricant reservoir 42 outwardly into the area 44 of the recess. Referring to the reservoir 40 at the center of the pin 12, it is sealed by a rubber ring 45 with an axially extending bore 46 therein. Lubricant is introduced into the reservoir 40 through the axial slot 46 until the reservoirs 40 and 42 are full of lubricant. The bore 46 is then closed by a plug 47 that is inserted from outside of the link assembly.

Figure 2:
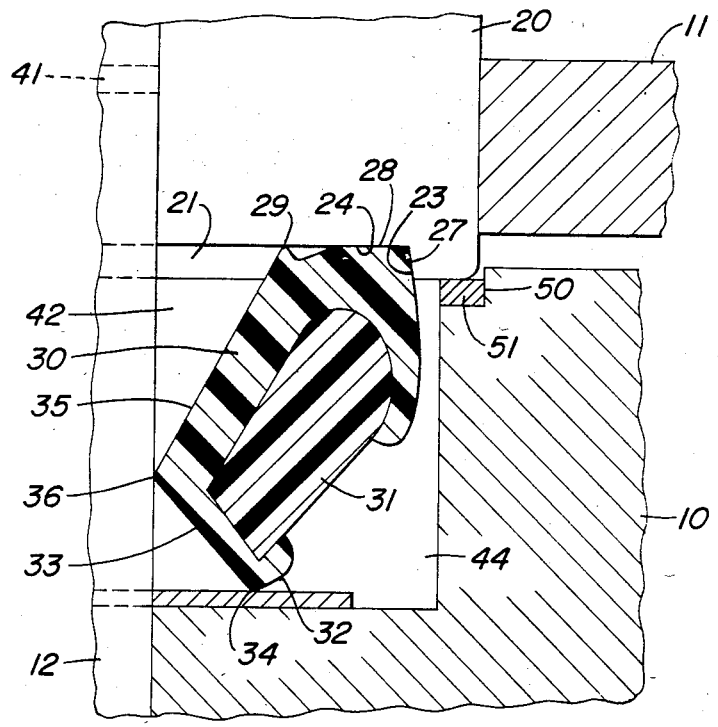
FIG. 2 is a sectional view of a modified form of the seal assembly.

Referring now to FIG. 2, which shows a modified form of the invention, the outer link end 10 has an annular shoulder 50 that projects radially from the recess 13. Seated in the shoulder 50 is a non-corrosive thrust washer 51 that may be replaced upon it becoming worn or damaged. The end of the track bushing 20 bears against and rides on the thrust washer 51. Other than this rather unique manner of supporting the end of the track bushing 20, other portions of the entire assembly are the same, and consequently, similar reference numbers are used.

In normal operation, due to these large surface contacts between the inner end of the main seal 30 and the walls 23, 24 forming the annular shoulder on the end of the track bushing, the entire seal assembly will oscillate with the link end 11 and the bushing 20. Oscillation of the lips 34 and 36 will be against hardened surfaces 17 of the bushing 16 and the surface of the pin 12.

While the invention has been described in conjunction with specific embodiments, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. A track link assembly comprising a pair of links extending in opposite directions from and pivotally connected at adjoining inner and outer link ends to a common pin transverse to the links, said outer link end having an annular recess next to and concentric with the pin and opening toward the inner link end; a track bushing on the pin extending through the inner link end to a bushing end terminating at said recess, said bushing end further having an annular groove in opposed relation to said recess; a thrust ring between the bushing end and a wall of the recess for retaining the bushing against axial shifting; a seal ring in the recess and having in cross-section a C-shaped interior and on its exterior having one of its ends seated in the annular groove and the opposite of its ends formed by diverging surfaces extending from an annular lip engaging said wall surface of the recess, one of said diverging surfaces joining a mating diverging surface extending from said one of its ends to form a primary seal lip engaging the outer surface of the pin; and a load ring of comparatively resilient elastomer material compacted in said C-shaped interior of said seal ring and tending to maintain pressure between said lips and their respective surfaces and the seating of said one end in said annular groove of said track bushing.

2. The invention defined in claim 1 in which said wall surface of said recess is in part the face of a thrust washer against which said annular lip engages.

3. The invention defined in claim 1 further characterized by said annular groove being radially outwardly offset with respect to the lips.

4. The invention defined in claim 1 in which the recess has an annular shoulder on the innermost side of the outer link end and the thrust ring sits in the shoulder, and said wall of the recess is an annular face of the shoulder.

5. A track link assembly comprising a pair of links extending in opposite directions from and pivotally connected at adjoining inner and outer link ends to a common pin transverse to the links, said outer link end having an annular recess next to and concentric with the pin and facing toward the inner link end; a track bushing on the pin extending through the inner link end to a bushing end terminating at said recess, said bushing end further having an annular groove in opposed relation to said recess; a hardened seal ring in the recess and having in cross-section a C-shaped interior and on its exterior having one of its ends conforming to the shape of and seated in the annular groove and at its opposite end having an annular lip engaging a radial wall surface of the recess and a lip engaging the outer surface of the pin; and a seal load ring of comparatively resilient elastomer material seated in said C-shaped interior of said seal ring and tending to maintain seating of said lips against their respective surfaces and said one end in said annular groove of said thrust washer.

6. A track link assembly comprising inner and outer links extending in opposite directions from and pivotally connected at adjoining inner and outer link ends to a common pin transverse to the links, said outer link end having an annular recess next to and concentric with the pin and opening toward the inner link and a track bushing on the pin extending through the inner link end to a bushing end terminating at said recess, said bushing end further having an annular groove in opposed relation to said recess; a comparatively hard seal ring in the recess and having in cross-section a hollow interior and further having one annular end conforming in shape to and seated in the annular groove and extending radially inwardly and axially from that end to an opposite annular end having a pair of annular lips, one of which engages a radial wall surface of the recess and the other of which engages the outer surface of the pin; and a load ring of comparatively resilient elastomer material in said interior of said seal ring and tending to maintain seating between said lips and their respective surfaces and of said one end in said annular groove.

7. The invention defined in claim 6 in which said wall surface of the recess is formed in part by the surface of a hardened steel washer against which the lip engages.

8. The invention defined in claim 6 in which said annular groove is formed by a radial wall extending to an outer axial wall that projects toward the recess and which said walls form an annular shoulder that receives and engages complimentary surfaces on said one end of the hard seal ring and further characterized by the shoulder being radially outside of said lips on the oppoiste end of the hard seal ring.

9. The invention defined in claim 8 in which the interior of said seal ring is C-shaped with the opening of the C opening radially outwardly and the load ring is insertable through the opening and resists distortion of the seal ring.

10. The invention defined in claim 6 further characterized by said one annular end of said hard seal ring having a third annular lip engaging a radial surface of said groove.

* * * * *